(12) United States Patent
Kim et al.

(10) Patent No.: US 7,179,394 B2
(45) Date of Patent: Feb. 20, 2007

(54) METHOD FOR MANUFACTURING LIQUID CRYSTAL DISPLAY

(75) Inventors: Dong Guk Kim, Euiwang-si (KR); Woo Nam Jeong, Anyang-si (KR)

(73) Assignee: LG.Philips Co., Ltd., Seoul (KR)

( * ) Notice: Subject to any disclaimer, the term of this patent is extended or adjusted under 35 U.S.C. 154(b) by 125 days.

(21) Appl. No.: 10/747,394

(22) Filed: Dec. 30, 2003

(65) Prior Publication Data

US 2004/0152320 A1    Aug. 5, 2004

(30) Foreign Application Priority Data

Dec. 31, 2002    (KR)    ............... 10-2002-0088525

(51) Int. Cl.
*C30B 33/00*    (2006.01)
*I01L 21/302*    (2006.01)
*I10L 21/461*    (2006.01)

(52) U.S. Cl. .................. 216/23; 438/689; 257/59; 257/72

(58) Field of Classification Search ............ 216/23; 438/689; 257/59, 72
See application file for complete search history.

(56) References Cited

U.S. PATENT DOCUMENTS 6,630,686 B1 * 10/2003 Kim ..................... 257/72
2003/0103181 A1 * 6/2003 Imayama et al. ........ 349/122

* cited by examiner

*Primary Examiner*—Nadine Norton
*Assistant Examiner*—Mahmoud Dahimene
(74) *Attorney, Agent, or Firm*—McKenna Long & Aldridge LLP (57) ABSTRACT

A method for manufacturing a liquid crystal display to prevent seal opening and perform a Tape Automated Bonding (TAB) repair process. The method includes depositing an organic passivation layer on an entire area of a lower substrate where TFTs, data bus lines and data pads are formed, forming contact holes on source/drain electrodes, removing the organic passivation layer from a data pad area and a gate pad area, and using the organic passivation layer with contact holes as a mask, wherein the gate pad area is opened, and forming a reflection electrode or a pixel electrode on the lower substrate.

20 Claims, 8 Drawing Sheets

Gate pad area (A)    Gate link line area (B)    Active area (C)

METHOD FOR MANUFACTURING LIQUID CRYSTAL DISPLAY

This application claims the benefit of Korean Patent Application No. 10-2002-0088525, filed on Dec. 31, 2002, which is hereby incorporated by reference for all purposes as if fully set forth herein.

BACKGROUND OF THE INVENTION

1. Field of the Invention

The present invention relates in general to a method for manufacturing a liquid crystal display and, more particularly, to a method for manufacturing a liquid crystal display, capable of improving adhesion of a color filter substrate and an array substrate without adding a mask process, and preventing seal opening.

2. Discussion of the Related Art

Usually when cathode ray tubes are applied to display devices like televisions or computer monitors, they are heavy, large, and has much power consumption. So, it is not quite easy to install and carry them anywhere. Introduced to overcome these problems and now widely used display devices are LCD (Liquid Crystal Display) devices using liquid crystal, PDPs (Plasma Display Panel) using surface discharge, or FEDs (Field Emission Device) using electric field emission.

Among those display devices, particularly LCD devices have seen widespread commercial use because they are characterized as having low power consumption, low driving voltage, fine pitch (high definition), or full color display, which are typical features seen in cathode ray tubes. The simplified manufacturing process of LCD devices is another reason why LCD devices are applied to diverse electronic devices.

LCD devices are largely divided into transmission type LCD devices using an exterior light source, and reflection type LCD devices using natural light (e.g., sunlight).

The reflection type LCD is advantageous in that it has low power consumption, and is sufficiently thin and light not using a backlight device, yet shows excellent displays outdoors. Because of these optimal conditions, the reflection type LCD is preferred for use in a portable device.

The general reflection type LCD is basically constructed of an upper substrate to which a polarization plate is attached, a lower substrate to which a reflection plate is attached, and a liquid crystal layer inserted between the upper and lower substrates. Incident light on the upper substrate transmits the liquid crystal layer, and is reflected by the reflection plate, and transmits again the liquid crystal layer and the upper substrate in order, and finally is emitted to the outside. If light is incident upon the reflection type LCD from an exterior light source located in a particular direction, the incident light is reflected only to an opposite direction of the particular direction. As a result, viewing angle of the light to a user is narrowed. To obviate this phenomenon, manufacturers usually deposit a scattering layer on the upper substrate of the reflection type LCD to scatter the reflected light, or design the reflection plate on the lower substrate to have a uneven surface.

Figure 1A:
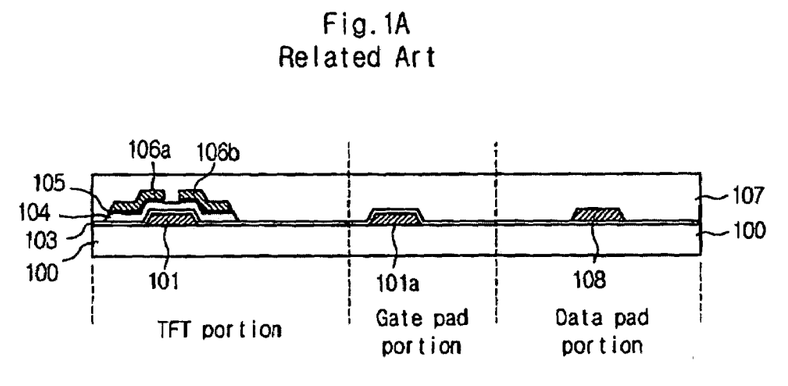
FIGS. 1A through 1C illustrate manufacturing processes of a liquid crystal display (LCD) according to a related art.
Figure 1B:
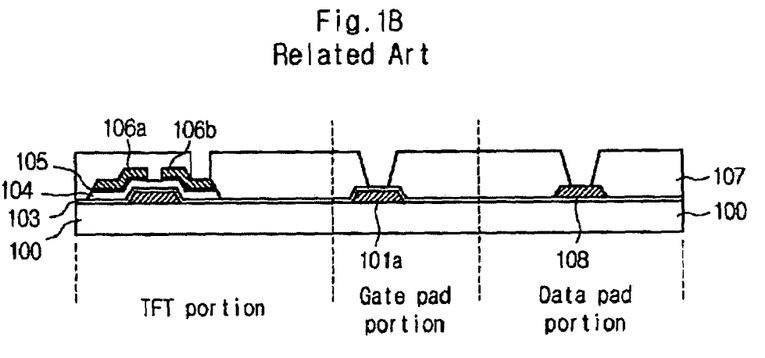
Figure 1C:
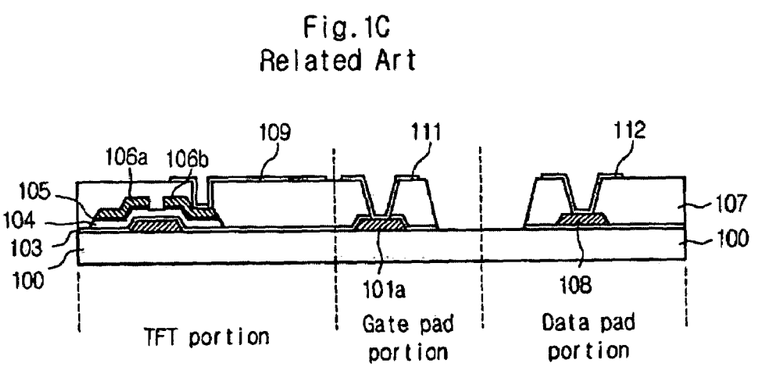

FIGS. 1A through 1C illustrate manufacturing processes of a LCD according to the related art. In the drawings, although a TFT portion, a gate pad portion and a data pad portion composing an array substrate look like they are all connected to one another, this is just for convenience of explanation, and in reality, as is well known, they are not connected. For instance, unlike what is shown in the drawings, the gate pad portion can be positioned on the left side of the TFT portion, and the data pad portion at an upper portion of the TFT, respectively. As aforementioned, the TFT portion, the gate pad portion and the data pad portion seem to be connected to one another in FIGS. 1A through 1C, but this is simply for having all of them on the same drawing.

As shown in FIG. 1A, gate metal is deposited on an entire area of transparent lower substrate 100, and through a photolithography process, a gate electrode 101, a gate bus line and a gate pad 101a are formed. Then a gate insulating layer 103 is deposited on the whole area of the lower substrate 100, followed by an amorphous silicon layer and a doped to amorphous silicon layer in order. The photolithography process is performed on the lower substrate 100 deposited with the doped amorphous silicon layer to form an active layer on an area where the TFT portion is supposed to be formed, the active layer including a channel layer 104 and an ohmic contact layer 105. Afterwards, a source/drain metal layer is deposited over the entire area of the lower substrate 100 on which the active layer has been formed. Next, source/drain electrodes 106a and 106b, a data bus line and a data pad 108 are formed by etching the source/drain metal layer. An organic passivation layer 107 is used to coat the whole area of the lower substrate 100. Particularly, this organic passivation layer 107 is deposited to form a uneven reflection electrode made of AlNd metal in case of the reflection type LCD. On the other hand, the organic passivation layer 107 is deposited and a pixel electrode made of ITO metal is formed in the case of a transmission type LCD.

As depicted in FIG. 1B, if the organic passivation layer 107 is coated over the entire area of the lower substrate 100, the photolithography process should be performed to expose the upper portion of each of the source/drain electrodes 106a and 106b, the gate pad 101a and the data pad 108. The organic passivation layer 107 is then removed from other areas except the gate bus line and the data bus line in a seal area, a designated portion where the gate bus line connected to the gate pad 101a contacts with a seal line. This eventually prevents seal line from opening caused by weak adhesion between the seal line and the organic passivation layer 107.

As depicted in FIG. 1C, if a contact hole is formed on the organic passivation layer 107 and the pads are exposed and the organic passivation layer is removed in other areas except for the gate bus line and the data bus line, an AlNd group metal layer is deposited over the entire area of the lower substrate 100, given that the reflection type LCD is involved, while a ITO group metal layer is deposited over the lower substrate 100 if the transmission type LCD is involved. And, through the photolithography process, the reflection electrode or pixel electrode 109, a gate pad pattern 111 and a data pad pattern 112 are formed. Here, in the case of the reflection type LCD, the reflection electrode can be formed out of the deposited AlNd group metal layer, and in the case of the transmission type LCD, the pixel electrode can be formed out of the ITO group metal layer.

Figure 2:
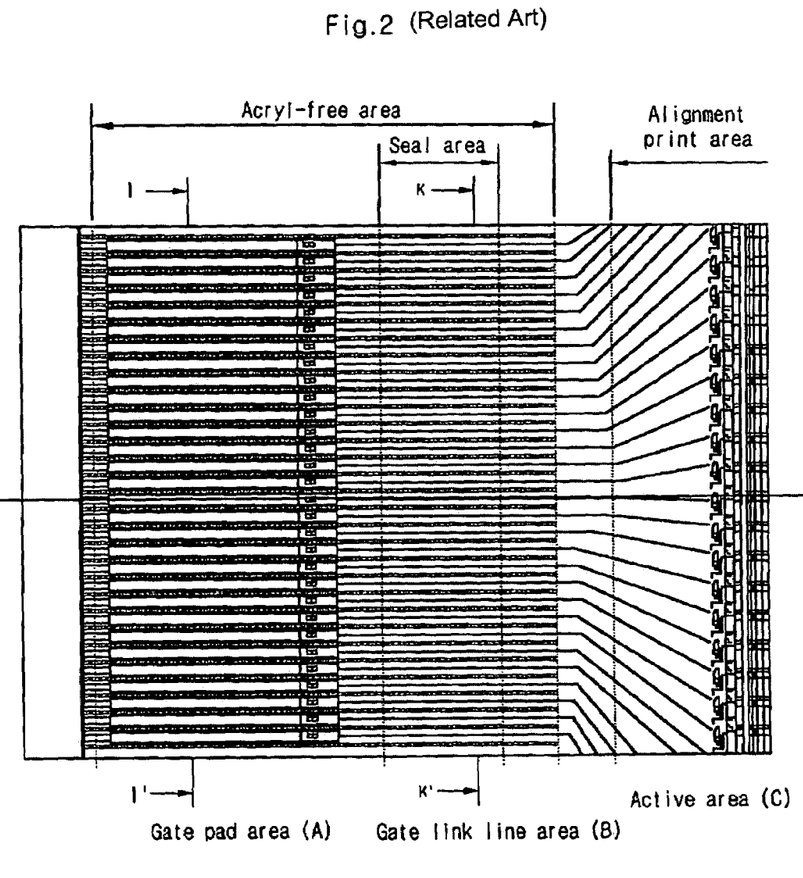
FIG. 2 is an exploded plan view of a gate pad portion of an array substrate in a LCD device according to the related art.

FIG. 2 is an exploded plan view of the gate pad portion on the array substrate of the related art LCD device.

As shown in FIG. 2, as the organic passivation layer between gate pads is removed, the gate pad portion now has a shape of a washboard. A seal area, an area on a color filter substrate where the seal line is formed, exists on the gate link lines arrayed on a gate link line area (B) sandwiched between a gate pad area (A) and a pixel active area (C). As the organic passivation layer is removed, the adhesion between the seal line and the lower substrate can be stronger.

That is, the organic passivation layer exists only over the gate link line of the seal area. Meanwhile, all of the organic passivation layer between the gate link lines, between the gate pads, and over the gate pad (pad opening) are removed. In short, the uneven shaped organic passivation layer serves to enhance the adhesion between the seal line and the lower substrate.

Figure 3A:
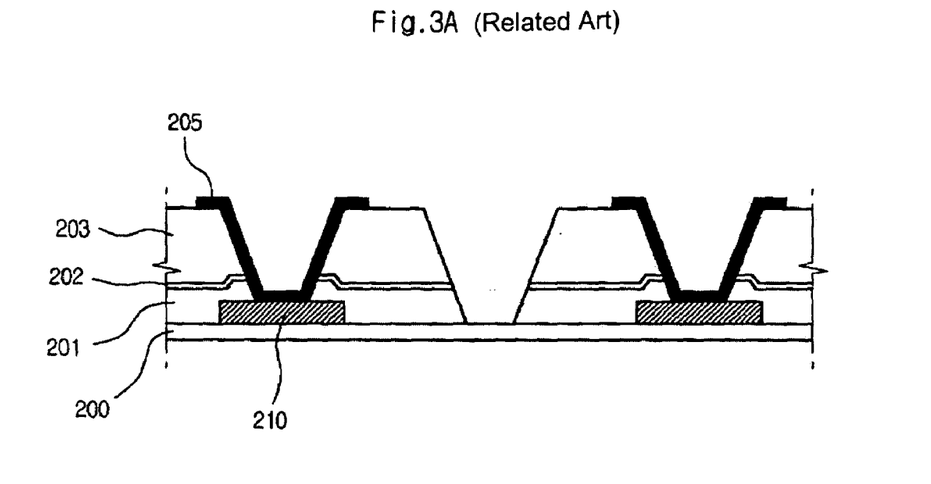
FIGS. 3A and 3B, respectively, illustrate cross-sectional view of a gate pad area and gate link line area without acryl according to one exemplary embodiment of the related art.
Figure 3B:
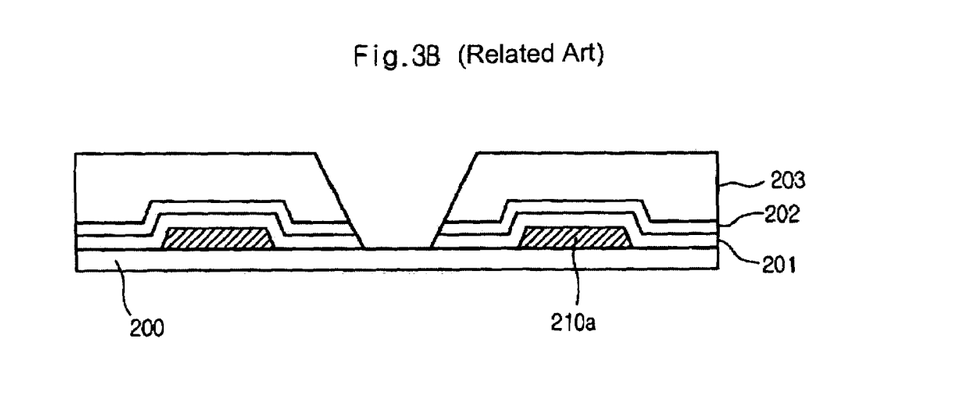

FIGS. 3A and 3B respectively illustrate cross-sectional views of a gate pad area and gate link line area without acryl according to one exemplary embodiment of the related art. More specifically, FIG. 3A is a cross-sectional view of the gate pad area taken along line I–I' of FIG. 2, in which an organic passivation layer between gate pad lines is removed. FIG. 3B is a cross-sectional view of the gate link line area taken along line K–K' in FIG. 2, in which an organic passivation layer between gate link lines is removed. One thing to notice here is that even though FIGS. 3A and 3B illustrated only two of the gate pads or the gate link lines, respectively, there are actually a great number of gate pads in the gate pad area or a great number of gate link lines in the gate link line areas.

As depicted in FIG. 3A, an organic passivation layer 203 between gate pads 210 is removed. This is done in order to prevent a seal opening by reducing a contact area between the seal line and the organic passivation layer and improving the adhesion between seal line and the organic passivation layer. In other words, opening up the gate pads, the organic passivation layer between gate pads 210 is removed, and the pad area has a uneven surface, meaning areas with the organic passivation layer thereon and areas without the organic passivation layer thereon are exhibited in turns. Another possible way to remove the organic passivation layer 203 between the gate pads 210 involves performing a patterning process while forming a contact hole thereon, and performing an etching process using the organic passivation layer 203 as a mask, the contact hole being formed on the organic passivation layer, and finally etching a buffer layer 202 and a gate insulating layer 201.

The organic passivation layer 203 between gate link lines 210a in FIG. 3B is also removed alternately. As shown, a gate insulating layer 201, a buffer layer 202, and an organic passivation layer 203 are layered in sequence on each of the gate link lines 210a.

Hence, throughout the gate pad area and the gate link line area as shown in FIGS. 3A and 3B, no organic passivation layer is formed between gate pads and between gate link lines, thereby making a uneven structure thereon.

Figure 4A:
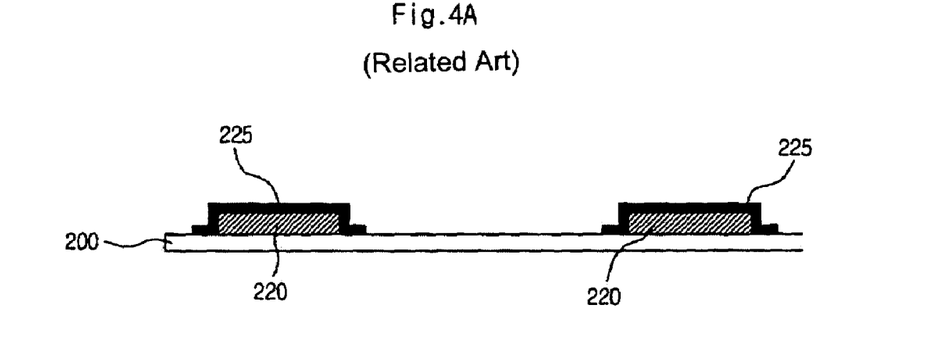
FIGS. 4A and 4B, respectively, illustrate a cross-sectional views of a gate pad area and gate link line area without acryl according to another exemplary embodiment of the related art.
Figure 4B:
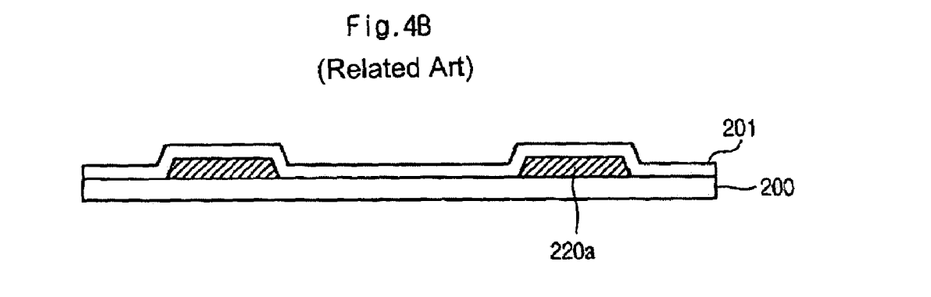

FIGS. 4A and 4B respectively illustrate cross-sectional views of a gate pad area and gate link line area without acryl according to another exemplary embodiment of the related art.

Originally a new structure in FIG. 4A is introduced in order to solve an outstanding problem associated with seal opening, which could not be completely overcome by the uneven pattern shown in FIGS. 3A and 3B at the absence of the organic passivation layer. In fact, the structure in FIG. 4A is derived from the gate pad portion in FIG. 2 by removing the organic passivation layer deposited from the gate pad portion (A) to the active area (C). That is, after coating the top surface of the lower substrate with the organic passivation layer, every bit of the organic passivation layer covering from the gate pad portion (A) to the active area (C) is removed by a photolithography process. Thus, when the seal line comes in contact with the organic passivation layer, it actually contacts with the areas without the organic passivation layer, and thus, the adhesion between them gets stronger.

To be more specific, when the organic passivation layer is completely removed through the photolithography process from the gate pad area (A) and the gate link line area (B) on the transparent lower substrate 200, a gate insulating layer exists on the gate pad area (A) and the gate link line area (B). Then, the gate insulating layer deposited on the gate pad area (A) and the gate link line area (B) is completely removed through an etching process, and as a result thereof, the entire gate pad and gate link line are exposed to the outside. However, a problem in this case is that all of the gate link lines can be removed by wet etching during the following process such as formation of a pixel electrode or reflection electrode.

This explains why the organic passivation layer without the contact hole is not used as a mask for removing the gate insulating layer, and only the gate pad area (A) is exposed through the special photolithography process.

If only the gate pad area (A) is exposed, either AlNd metal layer or ITO metal layer is deposited on the whole area of the lower substrate, and a gate pad pattern 225 to be in contact with the gate pad is formed while forming the reflection electrode or the pixel electrode. As such, the gate pad area (A) illustrated in FIG. 4A, wherein the gate pad pattern 225 is directly formed on the gate pad 220, is obtained.

FIG. 4B shows the structure of the gate link line area (B) where gate link lines 220a are arrayed on the transparent lower substrate 200, and the organic passivation layer between the gate link lines 220a is completely removed. In this particular case, performing a mask process for exposing the gate pad 220, the gate insulating layer 201 existing on the gate link line 220a remains as it is. In this manner, the gate link line 220a is not cut off during a pixel electrode etching process followed thereafter.

After all, once the organic passivation layer is completely removed, the adhesion between the seal line and the gate pad area in this case gets much stronger than the one in the structure shown in FIGS. 3A and 3B. So far, the adhesion between the gate pad area and the seal line has mainly been focused on, but it is also possible to enhance the adhesion between the data pad area (portion) and the seal line using the same scheme.

To summarize, first, the related art method for manufacturing a LCD device for preventing seal opening attempted to improve adhesion between the seal line and the gate pad area by manipulating the gate pad area to have a uneven pattern (i.e., washboard shape) on its surface, which is accomplished by removing the organic passivation layer between the gate pads, and between gate link lines or data pads and data link lines as illustrated in FIGS. 3A and 3B. However, because the organic passivation layer was not completely removed from the gate link lines, the seal opening problem is still outstanding, only making a Tape Automated Bonding (TAB) repair process more complicated. Especially, at a time of a light test using an automatic probe or a probe pin, the pad was often taken away and got worsen.

Secondly, when every bit of the organic passivation layer was removed as illustrated in FIGS. 4A and 4B from the gate pad area and a contact area between the gate link line area and the seal line, the removed organic passivation layer was used as a mask to remove the gate insulating layer and expose the pad. As a result, gate link lines or data link lines are all exposed to the outside, and later those lines were removed by wet etching during the following process such as formation of a pixel electrode or reflection electrode. To obviate these problems, the pad could be opened up by removing the gate insulating layer through a special photography process. However in such case, an additional mask process is required, which only makes the overall manufacturing procedure more complicated and increases the cost of manufacture.

SUMMARY OF THE INVENTION

Accordingly, the present invention is directed to a method for manufacturing a liquid crystal display device that substantially obviates one or more of the problems due to limitations and disadvantages of the related art.

An advantage of the present invention is to provide a method for manufacturing a liquid crystal display capable of preventing seal opening by enhancing adhesion between a seal line and a pad area of an array substrate when adhering the array substrate to a color filter substrate, and simplifying a TAB repair process.

The foregoing and other advantages may be realized by providing a method for manufacturing a liquid crystal display (LCD), the method includes forming gate electrodes, gate bus lines and gate pads on a transparent lower substrate; sequentially coating the transparent lower substrate with a gate insulating layer, an amorphous silicon layer and a doped amorphous silicon layer, and etching the same to form an active layer on the transparent lower substrate; depositing source/drain metal layers on the lower substrate where the active layer is formed, and forming source/drain electrodes, data bus lines and data pads by etching the source/drain metal layers; coating an entire area of the lower substrate, on which the source/drain electrodes, data bus lines, and data pads are formed, with an organic passivation layer, and forming a contact hole through the organic passivation layer on the source/drain electrodes, and removing the organic passivation layer coated the data pad area and the gate pad area; etching the gate insulating layer using the organic passivation layer having the contact hole as a mask to expose the gate pad area; and depositing a metal layer on the entire area of the lower substrate having the opened gate pad area to form a reflection electrode where seal lines are attached.

Another advantage of the invention provides a method for manufacturing a liquid crystal display (LCD), the method including forming gate electrodes, gate bus lines and gate pads on a transparent lower substrate; sequentially coating the transparent lower substrate with a gate insulating layer, an amorphous silicon layer and a doped amorphous silicon layer, and etching the same to form an active layer on the lower substrate; depositing source/drain metal layers on the lower substrate where the active layer is formed, and forming source/drain electrodes, data bus lines and data pads by etching the source/drain metal layers; coating an entire area of the lower substrate, on which the source/drain electrode, data bus lines and data pads are formed, with an organic passivation layer, and performing a photolithography process to form a contact hole through the organic passivation layer on the source/drain electrodes, and removing the organic passivation layer coating the data pad area and the gate pad area; etching the gate insulating layer using the organic passivation layer having the contact hole as a mask to expose the gate pad area; and depositing a metal layer on the entire area of the lower substrate having the opened gate pad area to form a pixel electrode where seal lines are attached.

The above methods can be advantageously used for simplifying a TAB (Tape Automated Bonding) repair process, and preventing seal opening by removing the organic passivation layer from the gate pad and data pad areas on the array substrate, and depositing a reflection or pixel electrode material metal on the pad areas and the pad link line area where seal lines are attached.

Additional advantages, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

The invention will be described in detail with reference to the following drawings in which like reference numerals refer to like elements wherein.

DETAILED DESCRIPTION OF THE ILLUSTRATED EMBODIMENTS

The following detailed description will present a method for manufacturing a liquid crystal display (LCD) according to embodiments of the invention in reference to the accompanying drawings.

Figure 5:
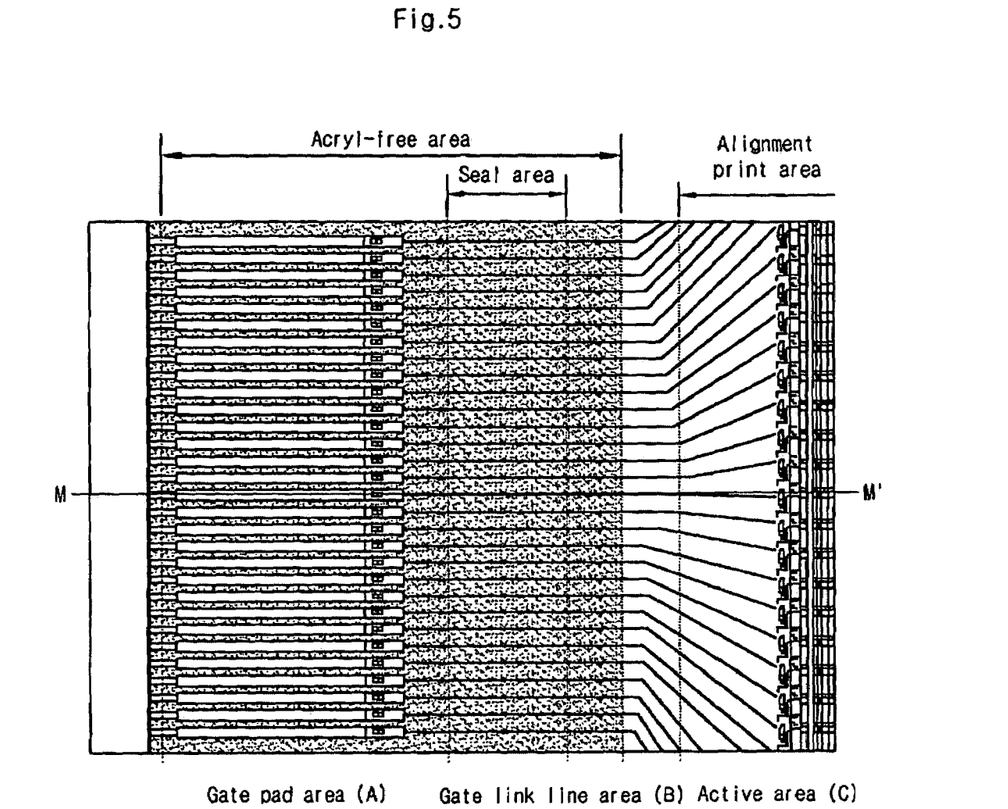
FIG. 5 is an exploded plan view of a gate pad portion on an array substrate of a LCD according to the present invention.

FIG. 5 is an exploded plan view of a gate pad portion on an array substrate in a LCD according to the present invention.

As shown in FIG. 5, the gate pad portion on the array substrate includes a gate pad area (A) where gate pads are formed, a gate link line area (B) where gate link lines are formed, and an active area (C) where TFTs are arrayed. A designated portion in the gate link line area, namely a seal area, comes in contact with seal lines formed on a color filter substrate. Also, an organic passivation layer is removed from a designated acryl-free area that covers the gate pad area (A) to the gate link line area (B) (not the active area (c)). Because of this, the gate pads and gate link lines are fully exposed to the outside of the substrate. In a case of the reflection type LCD, a reflection electrode metal (in case of a transmission type LCD, a pixel electrode metal) is uniformly patterned on the gate pads and the gate link lines until the pattern is overlapped with an area where a gate pad pattern is exposed.

In a method for manufacturing the gate pad portion on the array substrate, at first, an organic passivation layer is deposited on the lower substrate where gate bus lines and TFTs are formed. To improve adhesion between the seal lines and the gate pads, the gate pad area and the gate link line area are exposed during formation of contact holes. Afterwards, the organic passivation layer having the contact holes is used as a mask to open a gate insulation layer that is deposited on the gate pads and the gate link lines. As a result, the gate pads and the gate pad link lines are all exposed to the outside.

When forming a pad pattern after patterning the reflection electrode or the pixel electrode, the patterning process should be carefully performed over the gate pad area as well as the gate link line area, overlapping two areas. As such, an AlNd metal layer of the reflection electrode or an ITO metal layer of the pixel electrode has a layered structure, similar to the gate pads and the gate link lines.

This means that the exposed gate link lines are effectively protected during the wet etching process to form the reflection electrode or the pixel electrode, and no additional photolithography process for removing the gate insulation layer is required to expose the pads.

Figure 6A:
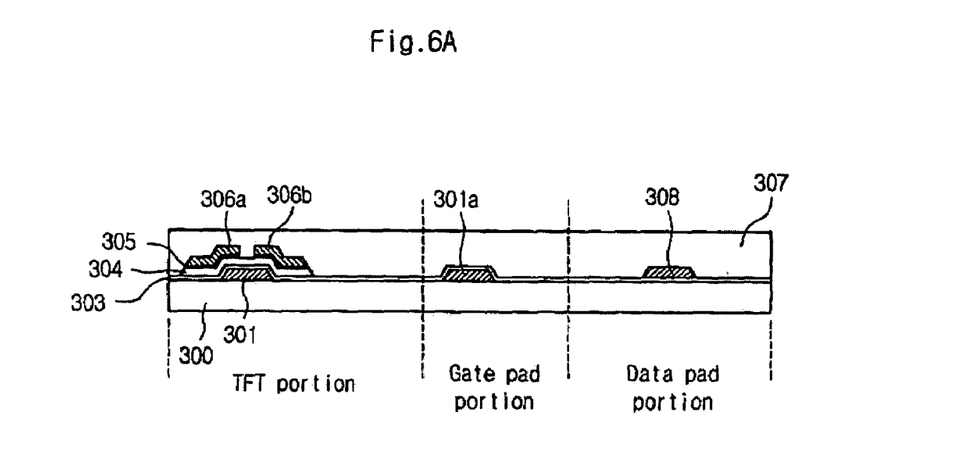
FIGS. 6A through 6C diagrammatically depict a procedure for forming a gate pad portion according to a manufacturing method of a LCD of the present invention.
Figure 6B:
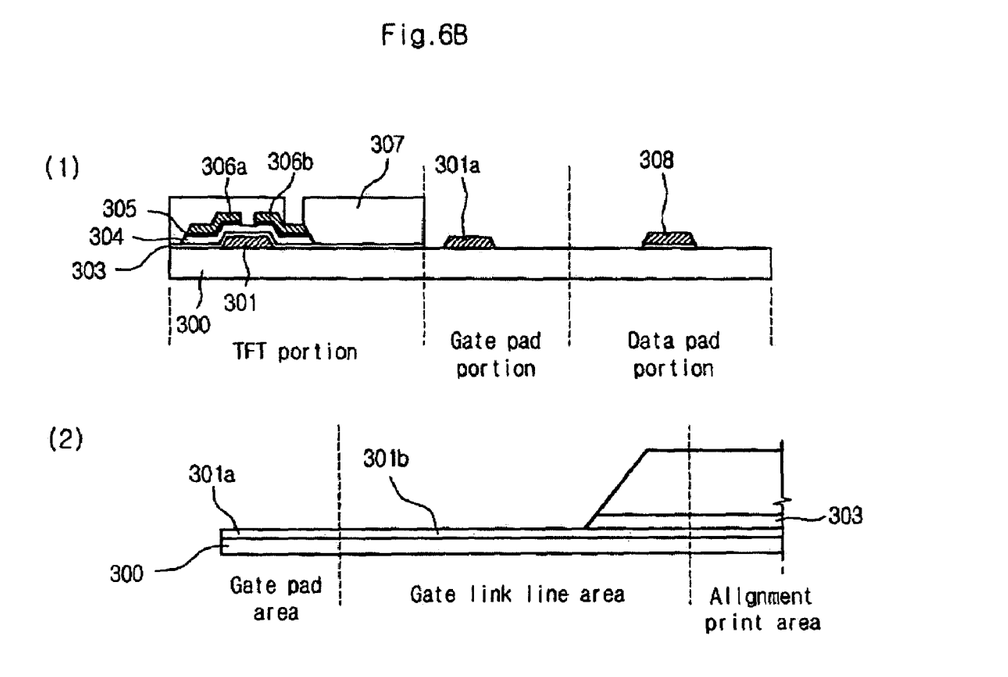
Figure 6C:
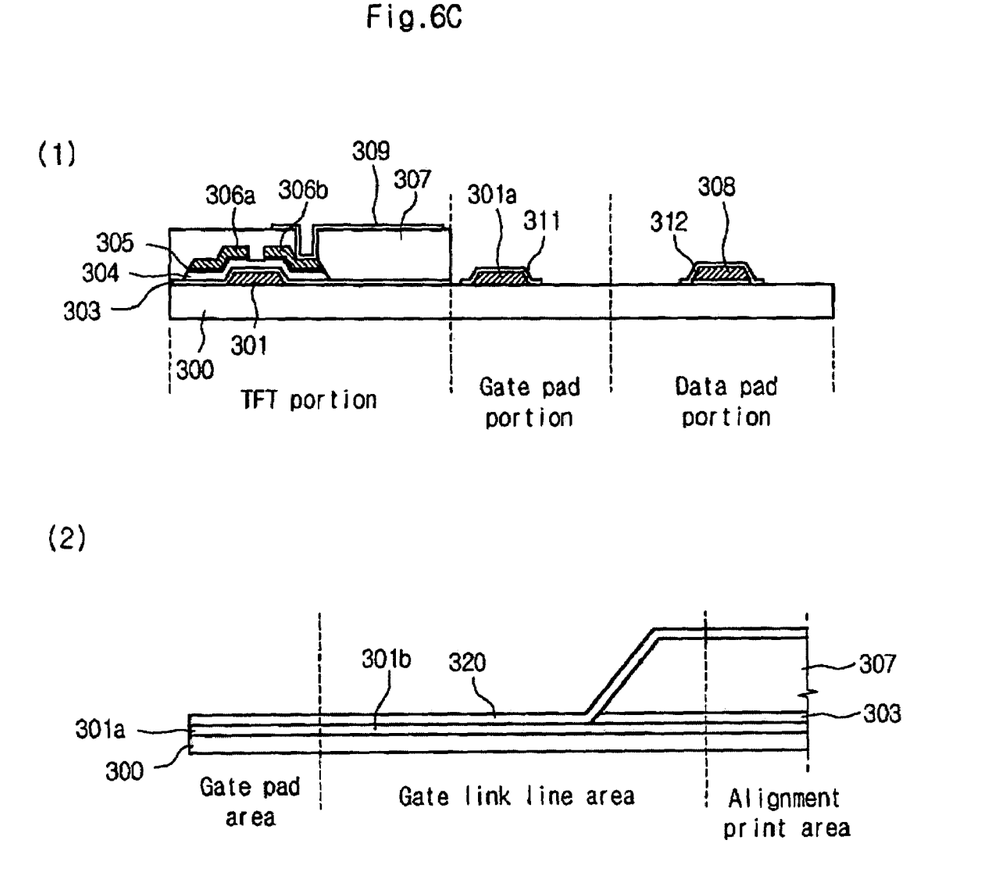

FIGS. 6A through 6C diagrammatically depict formation of a gate pad portion according to the manufacturing method of a LCD of the present invention.

As FIG. 6A shows, a gate metal is deposited on the entire area of a transparent lower substrate 300, and then through a photolithography process, gate electrodes 301, gate bus lines and gate pads 301a are formed. Later, a gate insulating layer 303 is deposited on the whole area of the lower substrate 300, followed by an amorphous silicon layer and a doped amorphous silicon layer in order.

Afterwards, a photolithography process is performed on the lower substrate 300 in which the doped amorphous silicon layer is deposited, thereby forming on an area where TFTs are supposed to be formed, an active layer composed of a channel layer 304 and an ohmic contact layer 305. Then, source/drain metal layers are deposited on the entire area of the lower substrate 300 having the active layer formed thereon.

By etching the source/drain metal layers, source/drain electrodes 306a and 306b are obtained. Hence, a switching element of the LCD, namely a TFT, is completed, followed by data bus lines, and data pads 308.

After the TFTs, data bus lines, and data pads 308 are formed on the lower substrate 300, an organic passivation layer 307 is deposited on the entire area of the lower substrate 300.

As illustrated in FIG. 6B(1), the organic passivation layer 307 deposited on the lower substrate 300 is removed particularly from a portion on the source/drain electrodes 306a and 306b where a contact hole needs to be formed and from a gate pad area to a portion before an alignment layer printing area.

Although FIGS. 6A through 6C illustrate the procedure of forming the gate pad portion, it is also possible to remove the organic passivation layer from a data pad portion. That is, the present invention is also applicable to all processes associated with the removal of organic passivation layer being in contact with seal lines.

As the organic passivation layer 307 is removed as disclosed as above, the area for the contact hole on the source/drain electrodes 306a and 306b, an area of the data pads 308 is exposed and the gate insulating layer 303 is deposited on an area of the gate pad 301a.

FIG. 6B(2) is a cross-sectional view taken along line M–M' in FIG. 5. As shown in the drawing, the gate insulating layer covers from the gate pads 301a and the gate link lines 301b except the area where the alignment layer is printed. At this time, to expose the contact holes and the pads, the organic passivation layer that underwent the photolithography process is used as a mask removing the gate insulating layer 303, the gate pads 301 are exposed, and the gate line lines 301b are exposed to the outside. In other words, the gate pads 301a in the gate pad area and the gate link lines 301b in the gate link line area except the area where the alignment layer is printed are all exposed.

As shown in FIG. 6C(1), in case of a reflection type LCD, an AlNd group metal layer is deposited on the whole surface area of the lower substrate 300, and in case of a transmission type LCD, an ITO group metal layer coats the whole surface area of the lower substrate 300.

FIG. 6C(2) is a cross-sectional view taken along line M–M' in FIG. 5. As depicted in the drawing, while the reflection electrode or the pixel electrode 309 is being formed through a wet etching process, a patterning process is performed on the gate pads 301a and the gate link lines except those in the area where the alignment layer is printed, the AlNd metal layer or the ITO metal layer being overlapped in the gate pad area and the gate link line area. That is, the patterning process is performed in such a manner that two metals are overlapped in the gate pad area and the gate link line area except the area where the alignment layer is printed. In this way, the gate pads and gate link lines having this overlapped layer structure are all exposed or opened to the outside.

Therefore, a gate pad pattern to be used in the reflection electrode or the pixel electrode 309 is formed on a contact area between the gate link line area and the seal line. Through this patterning, the adhesion between the seal line and the gate link line area is enhanced. Besides the gate link line area, the gate pad pattern 311 and 312 is also formed on the gate pad and the data pad area. Also, the gate pad pattern 320 is formed on a portion without the organic passivation layer 307. Thus, even during a wet etching process for the formation of the reflection electrode or the pixel electrode 309, the gate link lines 301b are not removed.

Figure 7:
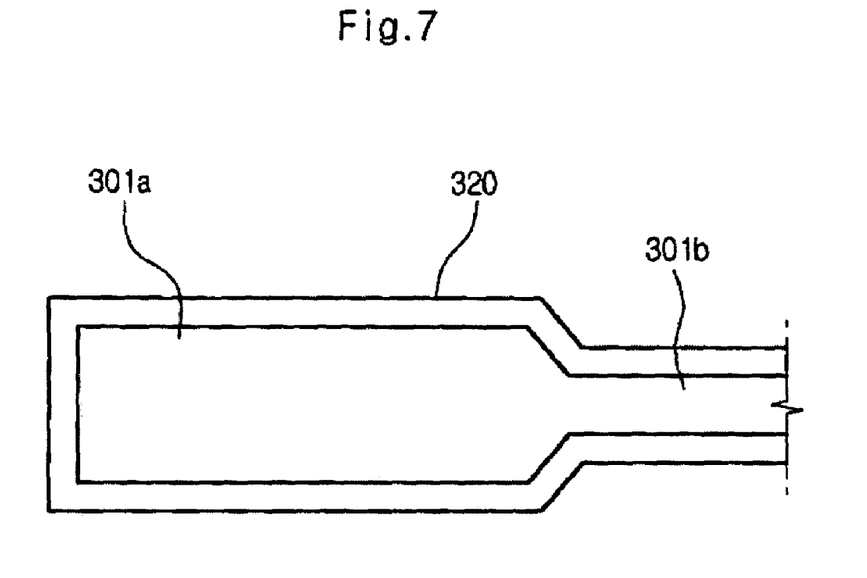
FIG. 7 shows a gate pad portion that is manufactured in accordance with the present invention.

FIG. 7 illustrates a gate pad portion that is manufactured in accordance with the present invention. Although only one gate pad and one gate link line connected thereto are depicted in the drawing, there are actually a plurality of gate pads and gate link lines in the gate pad portion.

As shown in FIG. 7, the gate pad 301a is exposed, and a reflection electrode or pixel electrode element, namely AlNd metal or ITO metal layer, is deposited on the gate pad 301a and the gate link line 301b.

Since a gate pad pattern 320 is deposited from a contact portion between a seal line with the gate link line 301b (except the area where an alignment layer is printed), the gate link line is not easily removed even during a wet etching process for the formation of the reflection electrode or the pixel electrode.

In case of performing a dry etching process using an organic passivation layer as a mask, an etching taper should be gently tilted in order to prevent an under cut problem. Even when the AlNd metal layer is deposited, it is not necessarily cut off in an area without the organic passivation layer.

The present invention has focused mainly on the gate pad area, but the method be applied to all contact areas with seal lines. If data link lines and gate link lines could be damaged from a wet etching process while removing an organic passivation layer like the organic passivation layer, the double (overlapped) metal layer can be effective for preventing the seal opening problem.

The present invention can be advantageously used for improving adhesion between seal lines and the array substrate by removing acryl deposited on the pad area of the array substrate, and layering metal layers to be overlapped not only in the pad area but also in the pad link lines withdrawn from the pixel active area.

Moreover, without the organic passivation layer, the pad portion and the pad link lines are opened, so it becomes easier to perform the TAB repair process thereon.

It will be apparent to those skilled in the art that the various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display (LCD), the method comprising:
    forming gate electrodes, gate bus lines and gate pads on a transparent lower substrate having an active area, a gate link line area and a gate pad area;
    forming a gate insulating layer on the transparent lower substrate;
    forming an amorphous silicon layer and a doped amorphous silicon layer on the gate electrodes;
    forming source/drain electrodes, data bus lines and data pads on the transparent lower substrate;
    coating an organic passivation layer on the transparent lower substrate;
    opening a contact hole through the organic passivation layer on the source/drain electrodes, and removing the organic passivation layer coated on a data pad area and the gate pad area;
    etching the gate insulating layer using the organic passivation layer having the contact hole as a mask to expose the gate pad area and the gate bus lines; and
    depositing a metal layer on the active area, the gate link line area and the gate pad area to form a reflection electrode,
    wherein the organic passivation layer is entirely removed in a range of the pad areas to the link line area,
    wherein the metal layer is deposited directly on the pad areas and link line area in the range.

2. The method according to claim 1, wherein the metal layer comprises AlNd metal.

3. The method according to claim 1, wherein the organic passivation layer is made of an acryl group substance.

4. The method according to claim 1, wherein the organic passivation layer is entirely removed from the gate pad area covering the gate pads and gate link lines except an area of the active area where an alignment layer is printed.

5. The method according to claim 1, wherein the metal layer on the gate link line area and the date pad area provide a layered metal structure.

6. The method according to claim 1, wherein the metal layer on the gate link line area and the gate pad area provide a layered metal structure.

7. The method according to claim 1, wherein the reflection electrode is formed during a wet etching process.

8. A method for manufacturing a liquid crystal display (LCD), the method comprising:
    forming gate electrodes, gate bus lines and gate pads on a transparent lower substrate having an active area, a gate link line area and a gate pad area;
    forming a gate insulating layer on the transparent lower substrate;
    forming an amorphous silicon layer and a doped amorphous silicon layer on the gate electrodes;
    forming source/drain electrodes, data bus lines and data pads on the transparent lower substrate;
    coating an organic passivation layer on the transparent lower substrate;
    opening a contact hole through the organic passivation layer on the source/drain electrodes, and removing the organic passivation layer coated on a data pad area and the gate pad area;
    etching the gate insulating layer using the organic passivation layer having the contact hole as a mask to expose the gate pad area and the gate bus line; and
    depositing a metal layer on the active area, the gate link line area and the gate pad area to form a pixel electrode,
    wherein the organic passivation layer is entirely removed in a range of the pad areas to the link line area,
    wherein the metal layer is deposited directly on the pad areas and the link line in the range.

9. The method according to claim 8, wherein the metal layer comprises ITO metal.

10. The method according to claim 8, wherein the organic passivation layer is made of an acryl group substance.

11. The method according to claim 8, wherein the organic passivation layer is entirely removed from the gate pad area covering the gate pads and gate link lines except an area of the active area where an alignment layer is printed.

12. The method according to claim 8, wherein the metal layer is formed to provide a layered metal structure in the data pad area and the gate link line area.

13. The method according to claim 8, wherein the metal layer is formed to provide a layered metal structure in the gate pad area and gate link line area.

14. The method according to claim 8, wherein the pixel electrode is formed during a wet etching process.

15. The method according to claim 1, wherein the pad areas include the gate pad area and the data pad area.

16. The method according to claim 8, wherein the pad areas include the gate pad area and the data pad area.

17. The method according to claim 1, wherein the link line area includes the gate link line and a data link line.

18. The method according to claim 8, wherein the link line area includes the gate link line and a data link line.

19. The method according to claim 1, wherein the metal layer is formed to entirely overlap a pad of the pad areas and a link line of the link line area.

20. The method according to claim 8, wherein the metal layer is formed to entirely overlap a pad of the pad area and a link line of the link line area.

* * * * *